(No Model.)
E. BARNUM.
VEGETABLE OR FRUIT PARER AND SCISSORS SHARPENER.
No. 531,404. Patented Dec. 25, 1894.
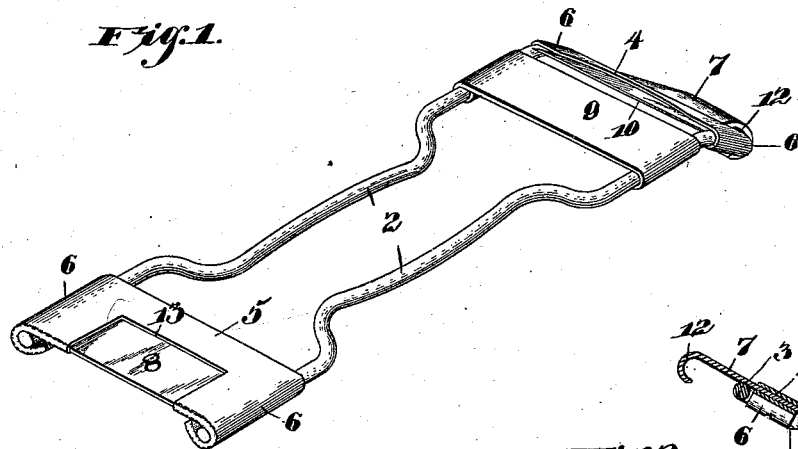
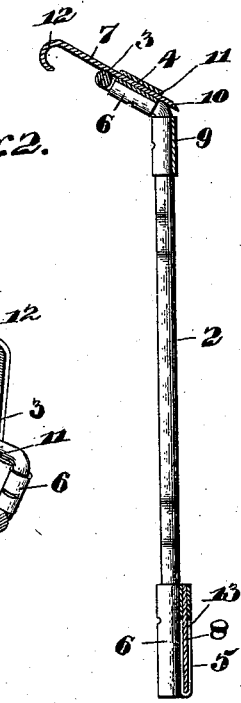
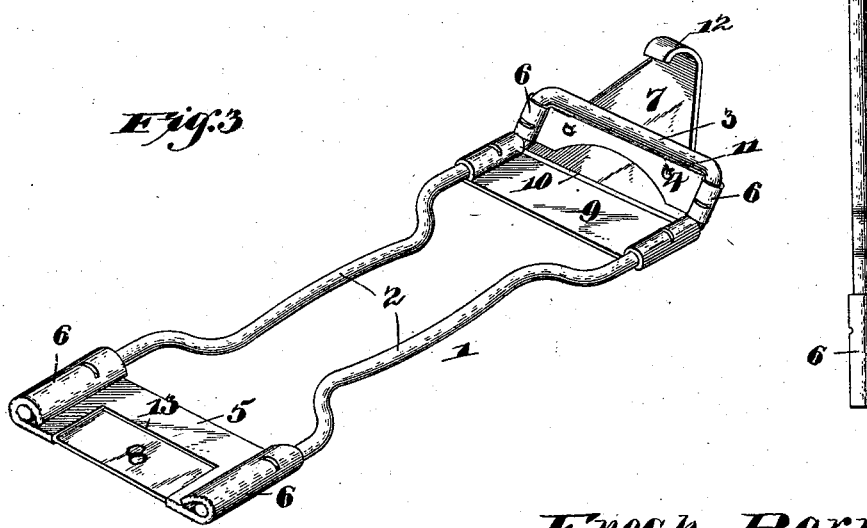
Inventor
Enoch Barnum.
Witnesses
By his Attorneys.

UNITED STATES PATENT OFFICE.

ENOCH BARNUM, OF WARRENSBURG, MISSOURI.

VEGETABLE OR FRUIT PARER AND SCISSORS-SHARPENER.

SPECIFICATION forming part of Letters Patent No. 531,404, dated December 25, 1894.

Application filed March 19, 1894. Serial No. 504,269. (No model.)

*To all whom it may concern:*

Be it known that I, ENOCH BARNUM, a citizen of the United States, residing at Warrensburg, in the county of Johnson and State of Missouri, have invented a new and useful Vegetable or Fruit Parer and Scissors-Sharpener, of which the following is a specification.

The invention relates to improvements in vegetable and fruit parers.

The object of the present invention is to provide a simple, inexpensive, and efficient knife, adapted for paring vegetables and fruit without unnecessary loss, and capable of enabling potato eyes, bruises, and bad portions to be readily removed.

A further object of the invention is to provide simple, convenient and efficient means for sharpening scissors, which will enable such operation to be performed by inexperienced persons.

The invention consists in the construction and novel combination and arrangement of parts, hereinafter fully described, illustrated in the accompanying drawings, and pointed out in the claims hereto appended.

In the drawings—Figure 1 is a perspective view of a parer constructed in accordance with this invention. Fig. 2 is a longitudinal sectional view of the same. Fig. 3 is a perspective view showing the back of the parer.

Like numerals of reference indicate corresponding parts in all the figures of the drawings.

1 designates a wire handle, composed of similar sides 2 and a transverse connecting portion 3 at one end of the handle which is bent at an angle. The sides have their ends arranged parallel and their intermediate portions are curved inward and brought nearer together to contract the handle to enable the same to conveniently fit the hand of the user. At each end of the handle is arranged a casing. These casings 4 and 5 are each provided at opposite sides with cylindrical sockets 6 receiving the ends of the side 2 and spacing the latter. These casings are composed of two sides, between which are arranged blades 7 and 8. The socket 4, which is arranged adjacent to the transverse wire portion 3, has secured in it an approximately triangular blade 7, which is supported by the transverse portion 3 of the handle, and which is arranged at an angle to a transverse tie-plate 9 connecting the sides of a handle at one end of the latter, and arranged adjacent to a transverse cutting edge 10 of the triangular blade, and forming a space for the passage of the parings. The transverse cutting edge 10 of the triangular plate projects slightly beyond the surface of the tie-plate, and regulates the thickness of the paring. The ends of the tie-plate are provided with sockets to receive the sides of the handle.

The outer edge of the casing 4 has its opening 11 receiving the tapering portion of the triangular blade and the outer end of the latter is curved rearward and inward at 12, forming a hook-shaped eye extractor and is adapted for extracting the eyes of potatoes, bruised portions of vegetables and fruit, and other bad places.

The triangular blade may be secured in its casing by any suitable means, but it is preferably attached by indenting the casing, as this will permit the blade to be readily detached when worn and to be readjusted after sharpening.

The casing 5 receives a blade 8 of steel, which has its outer edge exposed through an opening 13 of the casing, and by putting a pair of scissors on the edge of the blade 8 the blades of the scissors are quickly and conveniently sharpened.

It will be seen that a simple and comparatively inexpensive parer is constructed, that it is adapted to prevent unnecessary waste, and that by it the eyes of potatoes, bruised places or vegetables and fruit, and similar bad places may be readily removed. It will also be seen that a convenient scissors sharpener is provided, which will enable a pair of scissors to be readily and rapidly sharpened by an inexperienced person.

Changes in the form, proportion, and the minor details of construction may be resorted to without departing from the principle or sacrificing any of the advantages of this invention.

What I claim is—

1. A parer comprising a wire frame, a transverse plate arranged at one end of the handle, an inclined triangular blade arranged adjacent to the plate and provided with a transverse cutting edge and having its outer end or point curved rearward under it and forming a hook-shaped eye extractor, substantially as and for the purpose described.

2. A parer comprising a wire frame, a transverse plate arranged at one end of the handle, a casing arranged adjacent to the plate at an angle thereto and composed of two sides, and a blade arranged within the casing and provided with a transverse cutting edge located adjacent to the plate, substantially as described.

3. A parer comprising a wire handle having opposite sides and having one end bent at an angle and provided with a transverse connecting portion, a casing provided with sockets receiving the handle and composed of opposite sides, a blade arranged within the casing and supported by the transverse portion of the handle, a transverse tie-plate provided at its ends with sockets to receive the sides of the handle and arranged adjacent to the blade, substantially as and for the purpose described.

4. The combination of a wire handle having opposite sides, a transverse casing connecting the sides at one end of the handle and provided with sockets to receive said sides, and having at its outer edge an opening, and a blade arranged in the casing and exposed through the opening and forming a scissors sharpener, substantially as described.

5. A parer and scissors sharpener comprising a wire handle having opposite sides, and a transverse connecting portion, the casings arranged at the ends of the handle and provided with sockets receiving the sides of the same, blades arranged in the casings, one of the blades being triangular and having its outer point curved and having a transverse cutting edge and arranged at an angle to the length of the handle, and a transverse tie-plate connecting the sides of the handle and arranged adjacent to the cutting edge of the triangular blade and forming an intermediate space, substantially as described.

In testimony that I claim the foregoing as my own I have hereto affixed my signature in the presence of two witnesses.

ENOCH BARNUM.

Witnesses:
J. M. SHEPHERD,
E. F. WILLIAMS.